3,792,000
ANTIFOULING COMPOSITION AND METHOD OF PREPARATION

Marvin T. Conger, Theodore A. Evans, and Larry A. Gordon, Akron, Ohio, assignors to The Goodyear Tire & Rubber Company, Akron, Ohio
No Drawing. Filed June 9, 1971, Ser. No. 151,532
Int. Cl. A01m 1/20; C08l 45/64; C09b 5/14
U.S. Cl. 260—3.5       8 Claims

ABSTRACT OF THE DISCLOSURE

Antifoulant compositions are made by forming a mixture of an elastomer, a resin and antifoulant, preferably of a tin compound, with the elastomer having a glass transition temperature below ambient temperature and the resin having a glass transition temperature above ambient temperature.

---

This invention relates to improvements in antifoulant coating materials and to the method of preparing said antifoulant materials. Particularly, this invention relates to a coating which has a relatively high concentration of antifoulant and a controllable release rate for the antifoulant.

More particularly, this invention relates to an antifoulant composition comprising an elastomer A, a resin B and an antifoulant, the ratio of elastomer A to resin B being sufficient to give the composition a diffusion rate for the antifoulant to a water-antifoulant composition interface at ambient temperature which will provide a concentration of antifoulant in the water within 1 mil of the interface in excess of the threshhold tolerance level of the fouling organism, said elastomer A being characterized by a glass transition temperature below ambient temperature, viz. 75° F. and resin B being characterized by a glass transition temperature above ambient temperature. Glass transition temperature of many polymers are given in Chapter III of J. Brandrup/E. H. Immergut's book, "Polymer Handbook," and thus they can readily be classified as to A or B type polymers.

For antifouling coatings to be effective, a means must be built into the coating for transporting the antifoulant to the surface and into the boundary layer where the foulants are active. Since the coating continuously must give off the anti-fouling chemical, after a period of time it loses its effectiveness and must be replaced. The antifoulant release mechanisms for these coatings are classified by us into three general types: (1) contact leaching, (2) soluble matrix, and (3) diffusion. Unfortunately, in application these release mechanisms have caused difficulty as the rate of release of the antifoulant was either too high or too low and led to rapid exhaustion of antifoulant or failure of the antifoulant to protect the surface from fouling.

One of the more successful means heretofore utilized to control the rate of release and thus prolong the life of the antifoulant coat was use of two layer coatings where the outside coating served to limit the rate loss of the antifoulant and the other coating served as a reservoir for the reserve antifoulant.

The two-coat system likewise had drawbacks such as the need to apply two coats of different composition. Also, the release rate is greatly affected by the thickness of the control coating applied. Excessive care is required to assure the proper control coating thickness in order to obtain reproduceable antifoulant protection.

We have observed that in the contact leaching type coatings the antifoulant is not soluble in the matrix and the matrix is not soluble in sea water. Water soluble materials must be present in sufficient quantities to exceed cubic packing. Under these conditions, each soluble particle will touch neighboring particles forming a potential channel for water to enter the coating and dissolve the antifoulant. This requires that the coating contain a minimum of about 53 percent by volume of seat water soluble material. The secret to increasing the effective life of this type coating lies in controlling the dissolution rate of the soluble materials in the sea water.

The soluble matrix coating is one in which the matrix is slightly soluble in sea water. As the matrix is slowly dissolved away, a new antifouling surface is continuously being exposed, thus the chemical is constantly supplied to the boundary layer. The effective life of this type coating is dependent on the dissolution rate of the matrix material.

Likewise, we have found that the diffusion type coating is one in which the antifoulant chemical can diffuse through the matrix material. It does not require excessive concentrations of soluble material. As the antifoulant is dissolved from the surface layer by sea water, the remaining material redistributes in an attempt to maintain equilibrium within the coating. If migration is sufficiently controlled it is possible to maintain an antifouling environment in the boundary layer at the surface of the coating. We have found that it is desirable to control this migration rate in the coating so that the release rate to the boundary layer is just above the threshhold limit for fouling organisms.

Therefore, an objective of this invention is to provide an antifoulant coating of the diffusion type which has a controlled rate of release and preferably enhanced ability to hold the antifoulant.

The object of this invention is accomplished by the use of a single system in which the concentration of the antifoulant is relatively high but generally below cubic packing and the loss rate is controlled by the proper selection and combinations of elastomer (A) and resin (B) polymers to give a diffusion rate for the antifoulant preferably slightly greater than the threshhold tolerance level of the fouling organism.

Ocean immersion tests have shown that diffusion coatings can be made with a variety of different matrices. Representative elastomeric A materials which we have used for matrices are butyl rubber, neoprene, Hypalon, natural rubber, high cis polyisoprene, high cis polybutadiene, ethylene propylene dimer, butadiene-styrene copolymer, acrylonitrile-butadiene copolymer and polyurethanes. The antifoulants which appear to be most effective in our coatings are the well-known organotin compounds such as the representative members tributyltin oxide, tributyltin sulfide, tributyltin fluoride, and triphenyltin chloride, although others have been investigated and can be used using relatively high concentrations (15 to 50 percent by volume) of antifoulant in these elastomeric A materails we have observed that, with matrix material having glass transition temperatures (low $T_g$) significantly below ambient temperature the loss rate is excessive and fouling occurs very quickly. On the other hand, we have discovered that any of those resins having glass transition temperatures (high $T_g$) significantly above ambient temperature (about 75° F.) tend to reduce the loss to such an extent that insufficient antifoulant is released to be effective. Representative B type resins having relatively high glass transition temperatures are polyvinyl chloride, copolymers of polyvinyl chloride, polystyrene, styrene-butadiene copolymers, chlorinated natural rubber, polypropylene, etc. Polyethylene is an anomaly due to its high crystallinity but is useful to a limited extent as a B resin. These resins show this low loss rate and substantial resistance to migration or diffusion of the organic tin compounds, hence these resins per se began to foul even when the antifoulant concentratio is relatively high.

We have discovered that by combining these low glass transition elastomers (A) with compatible high glass transition resins (B) it is possible to control the loss rate of the antifoulant in coatings containing high concentrations of the chemical. Unexpectedly, in some instances, a higher concentration of antifoulant can be obtained in these mixtures than can be obtainable in either the low or high glass transition temperature polymers per se. Thus, the blend of the high and low glass transition polymers permit a higher concentration of the antifoulant to be obtained in the matrix without excessive loss of antifoulant by bleeding or blooming.

A further advantage of our invention is the antifoulant can be depleted to levels where an antifoulant coating of the resin per se would have fouled. Hence, on a unit weight basis the antifoulant is used more effectively as the overall depletion level is lower when fouling begins.

The nature and further advantages of this invention can be more readily appreciated from the representative and illustrative examples wherein all parts and percentages are by weight unless otherwise indicated.

EXAMPLE I

To show this increase in effective antifoulant protection is possible, 20 parts and 60 parts of chlorinated natural rubber (Parlon) were added to two different 100 parts of neoprene (a chlorosulfonated polyethylene) by weight to give mixtures 1 and 2. Coating materials were made containing 60 parts (37.5%) of tributyltin fluoride (TBTF) per 100 parts by weight of the above mixtures 1 and 2 by mixing TBTF in a mixture of aromatic solvents such as toluene and xylene; preferably at 5 to 35% solids concentration. These coating materials were then painted on cleaned and primed 16" x 6" steel plates and immersed in Biscayne Bay at Miami Beach, Fla. The gauge of the coating containing 20 parts of chlorinated natural rubber on the steel plate was .0063 inches while the other was .005 inches. After one year there were only 4 barnacles on the plate containing 60 parts of Parlon. Although initially the coatings contained the same amount (37.5%) of organotin, one panel had failed in 9 months whereas the other was satisfactory after a year as it was still providing an effective organotin concentration at the water-coating interface. Thus, by adjusting the ratio of elastomer A to resin B in the coating, the diffusion of the TBTF to interface is controlled to prolong the antifoulant protection.

EXAMPLE II

A second series of test panels was made in which 20, 40 and 60 parts of chlorinated rubber were added to 100 parts of neoprene. Coatings were made in which 40 parts of tributyltin fluoride per 100 parts of the above polymer mixtures were mixed in aromatic solvents such as toluene. These were coated on primed steel plates 16" x 6" and immersed in Biscayne Bay at Miami Beach, Fla. The coating containing 20 parts Parlon was .0061 inches thick while the coatings containing 40 parts Parlon was .0044 inches thick and the coating containing 60 parts Parlon was .0053 inches thick. After 9 months there were 23 barnacles on the 20-part coating, 18 barnacles on the 40-part coating and 5 barnacles on the 60-part coating.

EXAMPLE III

Another series was made the same as above except the coatings were thicker. The coating containing 20 parts Parlon was .011 inches thick while the coatings containing 40 and 60 parts Parlon were .0096 inches thick. After 14 months' immersion there were 26 barnacles on the 20 parts coating, 18 barnacles on the 40 parts coating, and 5 barnacles on the 60 parts coating. Since these coatings were essentially the same thickness and had the same effective concentration of antifoulant, it should be apparent that those fouling first are losing the antifoulant at a faster rate.

EXAMPLE IV

Another series of specimens were made with mixtures of a methyl ethyl ketone soluble polyurethane available under the tradename TPU 652 and a polyvinyl chloride copolymer. The mixtures were 100/0 polyurethane/polyvinyl chloride copolymer, 60/40 polyurethane/polyvinyl chloride copolymer, and 40/60 polyurethane/polyvinyl chloride copolymer. Coating solutions were made from these mixtures containing 30 percent by weight of the total solids, triphenyltin chloride in ketone solvents. These were applied to primed rigid polyvinyl chloride panels 16" x 6" and immersed in Biscayne Bay at Miami Beach, Fla. The 100 percent polyurethane coating was .0024 inches thick while the coatings made from the 60/40 mixture was .0019 inches thick and the coating made from the 40/60 mixture was .025 inches thick. After three month's immersion, the coatings were analyzed and it was found that the polyurethane coating contained 5.5 percent triphenyltin chloride, the 60/40 mixture contained 7.1 percent triphenyltin chloride, and the 40/60 mixture contained 17.7 percent triphenyltin chloride. After 5 months' immersion there were 20 barnacles on the polyurethane coating, 3 barnacles on the 60/40 mixture and no barnacles on the 40/60 coating. Even though each coating contained the same initial concentration of triphenyltin chloride, by the end of three months' immersion the tin concentration had dropped to the levels shown above and by 5 months the tin lost from the polyurethane coating was sufficient to result in significant barnacle fouling with the polyurethane coating, whereas the blend coatings were more resistant to fouling.

EXAMPLE V

Another series of test panels was made using 100 percent polyurethane (TPU 652), 80/20 polyurethane (TPU 652) polyvinyl chloride copolymer, 60/40 polyurethane (TPU 652) polyvinyl chloride copolymer, and 40/60 polyurethane (TPU 652) polyvinyl chloride copolymer. Coatings were made from these mixtures containing 30 percent tributyltin fluoride by weight of the total solids in ketone solvents. These were coated on primed rigid vinyl plates 16" x 6" and immersed in Biscayne Bay at Miami Beach, Fla. The coating thicknesses were .0024 inches for the polyurethane coating, .0023 inches for the 80/20 mixture, .0028 inches for the 60/40 mixture, and .0023 inches for the 40/60 mixture.

After 3½ months' immersion, samples were taken from each of the above coatings and analyzed for content of tributyltin fluoride. The polyurethane coating was found to contain 3.3 percent tributyltin fluoride while the 80/20 mixture contained 6.4 percent tributyltin fluoride, the 60/40 mixture contained 17 percent tributyltin fluoride, and the 40/60 mixture contained 14.4 percent tributyltin fluoride. The apparent discrepancy between the content of the 60/40 mixture and the 40/60 mixture can be accounted for when it is considered that the 60/40 coating is more than 20 percent thicker than the 40/60 coating.

After 5 months' immersion of the above coatings, there were 48 barnacles on the polyurethane coating, 18 barnacles on the 80/20 coating, and no barnacles on either the 60/40 coating or the 40/60 coating. After 22 months' immersion there were 4 barnacles on the 60/40 coating and no barnacles on the 40/60 coating. Again, the rate of fouling is shown to be related to the rate of tin loss.

In all of the above examples there were no other types of fouling on the test surfaces except a very thin layer of algae and algae spores. No long grassy algae developed on the test specimens even though it is present in Biscayne Bay. No tube worms, tunicates, or hydroids developed on the test specimens.

By this invention a coating can be prepared that controls the release rate (diffusion) of the antifoulant from the coating matrix. When the release rate of the antifoulant just barely exceeds the threshold tolerance level of fouling organisms to the antifoulant, the foul-free life of the coating is increased due to the more effective use of the antifoulant.

Representative of the many improved diffusion type antifoulant coatings comprising a blend of elastomer A, resin B and antifoulant that can be prepared are blends of a vinyl resin, vinyl chloride-acetate copolymer (the vinyl terpolymer containing vinyl chloride, vinyl acetate, vinyl alcohol, with the percentages being preferably 91, 3 and 6 percent respectively) with a thermoplastic polyurethane such as TPU 652, preferably in a suitable solvent system, methyl ethyl ketone, cyclohexanone, etc. and adding an antifoulant chemical such as the representative tin compounds of triphenyltin chloride, bis-tributyltin oxide, or tributyltin fluoride. Ocean immersion test data indicates that the release rate of these antifoulants is decreased as the level of the modifying resin B is increased. Optimum blends of the TPU 652 and the above terpolymer of vinyl chloride resin preferably control the release rate of the toxicant such that the rate is just a step above the threshold tolerance level of the fouling organisms to the antifoulant until the antifoulant supply is exhausted.

By controlling the release rate of the antifoulant to the coating/water interface (boundary layer), the effective life of the coating can be significantly increased.

Other representative elastomeric/resin blends which have the ability to control the release rate of antifoulant are (1) polyvinyl chloride, (2) polyvinyl chloride/acrylonitrile-butadiene copolymers, (3) vinyl resin/acrylonitrile-butadiene copolymers (4) Hypalon/chlorinated natural rubber, and (5) neoprene/chlorinated natural rubber, to specifically mention only a few of the representative compatible combinations of elastomers and resins having the glass transition temperatures respectively below and above 75° F. Likewise, Hypalon/polyethylene are a nonrepresentative blend of elastomer A and B resins as polyethylene is so highly crystalline.

Our observation with the elastomer A (those of low $T_g$) indicates the organic tin compounds such as tri(butyltin fluoride) migrates too rapidly. This causes excessive loss of the organic tin compound and thus reduces the effective antifouling life of the elastomeric coating. But where elastomer A is blended with resin B, this reduces the rate of the loss of the organic tin compound and thus increases the effective antifouling life of the coating. It has been noted that with these blends, the efficiency of these organotins, as judged by the threshold loss rate for fouling organisms, is very good. The threshold loss rate for barnacles, usually considered primary fouling organism, is somewhat less than 1 microgram/square centimeter/day, and for hydroids, tunicates, and the tube worms it is even lower. Algae will attach at a somewhat higher threshold level but it does not seem to develop significant growth.

It has been observed that most fouling organisms do not eat the surfaces to which they attach. For this reason, merely having a toxic coating on the surface to be protected is not sufficient to prevent fouling attachment and growth. For such coatings to be effective, a means must be built into the coating for transporting the antifouling chemical to the surface of the coating and into the boundary layer between the coating and the water where the foulants are active.

Usually it is desirable and preferred that the blend contain at least 5 to 10 percent of resin B based on elastomer A and sufficient to give a diffusion rate sufficient to maintain the antifoulant concentration in the water-antifoulant composition interface at least about 1.05 to 3.5 times the threshold tolerance level of the fouling organism. Thus, the percentages of elastomer A usually will vary from 30 to 70 percent of the blend but with some antifoulants acceptable ranges may be as wide as 10 to 90 percent while with other resin B materials and antifoulants acceptable ranges will be as narrow as 40 to 60 percent.

The preferred tin compounds for use as antifoulants are those that are not soluble in the matrix solvent, for instance, methyl ethyl ketone at 75° F. and thus would be less prone to bleed or bloom from the elastomer A/resin B blend when the coating is applied to the surface to be protected. Representative of the many organic and inorganic tin compounds useful as antifoulants are those listed in British Pat. 734,119, Canadian Pat. 572,944, U.S. Pat. 2,862,944 and Dutch Pat. 6704657. The preferred organic tin compounds are the alkyltin oxides, triaryltin halide and trialkyltin halide with alkyl radical containing from 1 to about 20 carbon atoms, the aryl radical containing 6 to 18 carbon atoms and the halide being fluoride, chloride, bromide and iodide.

Although the preparation of the antifoulant composition has heretofore been described as preparation of a paint or coating, it should be appreciated that the antifoulant composition can be prepared by any of the usual rubber compounding techniques, viz. milling and used as a sheet material or as a coating. Thus, broadly, the antifoulant composition is prepared by intimately mixing the desired ratios of elastomer A, resin B and antifoulant, preferably a tin compound either organic or inorganic. The composition can be used as a laminate to wood, plastic, metal, glass, etc. with the laminate being formed by sheeting, spraying, painting, dipping and other techniques normally used to provide antifoulant protection.

While certain representative embodiments and details have been shown for the purpose of illustrating the invention, it will be apparent to those skilled in this art that various changes and modifications may be made therein without departing from the spirit or scope of the invention.

What is claimed is:

1. An antifoulant composition comprising an elastomer A, a resin B and a tin antifoulant compound, the ratio of elastomer A to resin B being sufficient to give the composition an antifoulant diffusion rate to the water-composition interface at water temperature of about 75° F. which will provide initially a concentration of antifoulant in the water area within 1 mil of the interface in excess of but no more than about 20 percent above the threshold tolerance level of barnacles, said elastomer A being characterized by a glass transition temperature below ambient temperature and resin B being characterized by a glass transition temperature above ambient temperature, said elastomer A being selected from the class consisting of polyurethane, acrylonitrile-butadiene copolymer, Hypalon, neoprene, natural rubber, high cis polyisoprene, and high cis polybutadiene, and said resin B is selected from the class consisting of polyvinyl cholride, polyvinyl chloride copolymers and chlorinated natural rubber.

2. The composition of claim 1 wherein elastomer A is a methyl ethyl ketone soluble polyurethane, resin B is a vinyl resin and the ratio of elastomer A to resin B varies from 30/70 to 70/30.

3. The composition of claim 1 wherein the antifoulant is a tin compound selected from the class consisting of trialkyltin oxide, triaryltin halide or trialkyltin halide.

4. The composition of claim 1 wherein elastomer A is a polymer of acrylonitrile-butadiene and resin B is a vinyl resin.

5. The composition of claim 1 wherein elastomer A is neoprene and resin B is a chlorinated natural rubber.

6. The composition of claim 1 wherein elastomer A is a chlorosulfonated polyethylene and resin B is a chlorinated natural rubber.

7. The composition of claim 1 wherein the elastomer A is 30 to 70 and resin B is 70 to 30 percent of the antifoulant composition.

8. The composition of claim 1 wherein the ratios of elastomer A to resin B are chosen to give an antifoulant concentration in the water-antifoulant composition interface at least 1.05 to 3.5 times the threshold tolerance level of a primary fouling organism.

References Cited

UNITED STATES PATENTS

| | | | |
|---|---|---|---|
| 3,350,211 | 10/1967 | Greenwald | 106—15 AF |
| 3,266,913 | 8/1966 | Hardy et al. | 106—15 |
| 3,331,693 | 7/1967 | Taylor | 106—15 |
| 2,579,610 | 12/1951 | Pitre | 106—15 |
| 3,426,473 | 2/1969 | Cardarelli et al. | 106—15 |
| 3,639,583 | 2/1972 | Cardarelli et al. | 106—15 |

OTHER REFERENCES

"Antifouling Paints," Alexander et al., Industrial and Engineering Chemistry, March 1948, pp. 461–464, vol. 40, No. 3.

JOHN C. BLEUTGE, Primary Examiner

U.S. Cl. X.R.

117—138.8 A, 161 A, 161 KP; 260—4 R, 859 PV, 889, 890, 891, 897 C; 106—15 AF

PO-1050
(5/69)

UNITED STATES PATENT OFFICE
CERTIFICATE OF CORRECTION

Patent No. 3,792,000  Dated February 12, 1974

Inventor(s) Marvin T. Conger, Theodore A. Evans and Larry A. Gordon

It is certified that error appears in the above-identified patent and that said Letters Patent are hereby corrected as shown below:

Column 2, line 12, change "seat" to -- sea --;
line 59, change "used using" to -- used. Using --;

Column 3, line 13, change "concentratio" to -- concentration --;

Column 4, line 33, change ".025" to -- .0025 --;

Column 5, line 71, change "loss" to -- less --;

Column 6, line 69, change "copolymer." to -- copolymer, --.

Signed and sealed this 29th day of October 1974.

(SEAL)
Attest:

McCOY M. GIBSON JR.
Attesting Officer

C. MARSHALL DANN
Commissioner of Patents